H. J. MITCHELL.
VEHICLE SPRING.
APPLICATION FILED MAY 19, 1913.
1,078,057.
Patented Nov. 11, 1913.
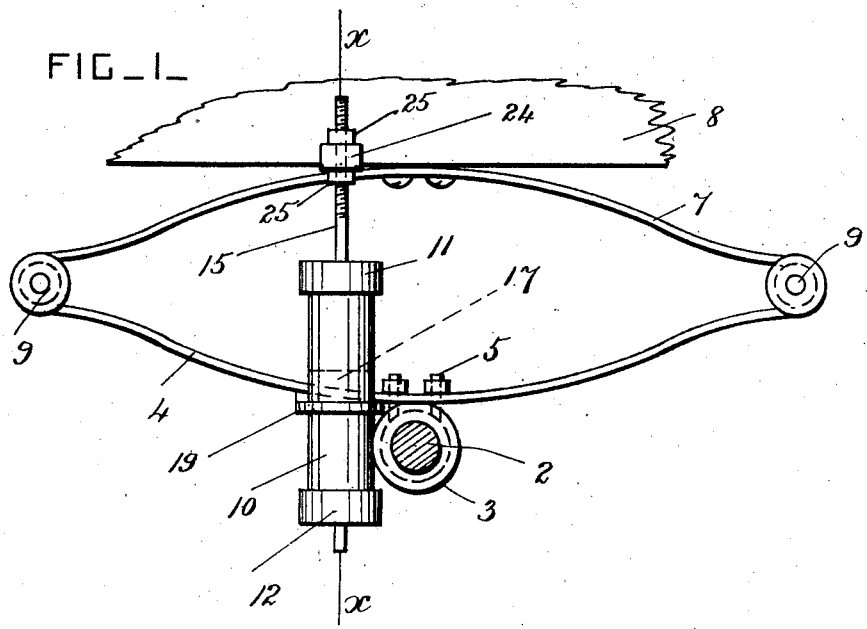
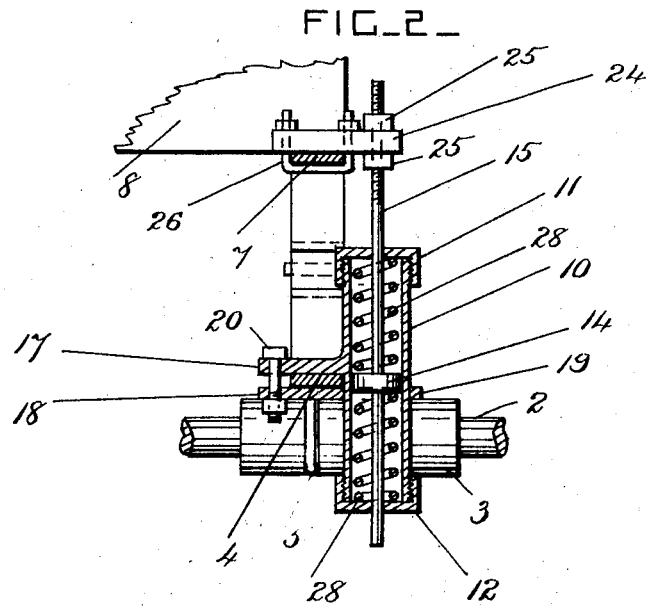
Witnesses
Wm H. Bates
L. N. Gillis
Inventor
Henry J. Mitchell,
Herbert W. J. Jenner.
By
Attorney

UNITED STATES PATENT OFFICE.

HENRY J. MITCHELL, OF ELKHART, INDIANA.

VEHICLE-SPRING.

1,078,057.  Specification of Letters Patent.  Patented Nov. 11, 1913.

Application filed May 19, 1913. Serial No. 768,476.

*To all whom it may concern:*

Be it known that I, HENRY J. MITCHELL, a citizen of the United States, residing at Elkhart, in the county of Elkhart and State of Indiana, have invented certain new and useful Improvements in Vehicle-Springs; and I do hereby declare the following to be a full, clear, and exact description of the invention, such as will enable others skilled in the art to which it appertains to make and use the same.

This invention relates to springs for wheeled vehicles such as motor cars; and it consists of an auxiliary spring device, secured to the main leaf springs which support the car body, as hereinafter fully described and claimed.

In the drawings, Figure 1 is a side view of a portion of a car body and two leaf springs provided with an attachment according to this invention and showing the axle in section. Fig. 2 is a vertical section, taken on the line $x$—$x$ in Fig. 1.

The axle 2 of the car is mounted in a bearing 3, and a lower leaf spring 4 is secured to the bearing 3 by a fastening device 5 of any approved construction. An upper leaf spring 7 is secured to the body 8 of the car in any approved way, and the end portions of the two leaf springs are pivotally connected together by pins 9, the said springs being curved in opposite directions and adapted to support the body of the car above its axle.

In order to absorb undesirable vibrations of the car body on its leaf springs, an auxiliary spring device is provided and is connected to the two leaf springs on one side of the axle. This spring device is provided with a cylinder 10 having its upper and lower ends closed by caps 11 and 12 respectively. A piston 14 is arranged inside the cylinder at about the middle of its length, and is secured upon a piston-rod 15 which projects through holes in the two caps. The middle part of the cylinder is provided with a laterally projecting lug 17 which rests on the lower leaf spring 4 to one side of the axle. A plate 18 is arranged under the spring 4 and has an eye or loop 19 which is slidable on the cylinder 10. A clamping bolt 20 is passed through holes in the lug 17 and plate 18 and secures the cylinder rigidly to the spring. The upper projecting end portion of the piston is provided with a plate 24 which is secured to it by nuts 25 screwed on its upper end portion, and this plate 24 is secured to the upper leaf spring by a strap bolt 26, or any other approved fastening device. Helical springs 28 are arranged in the end portions of the cylinder between its piston and the caps 11 and 12, and are arranged to have a different time of vibration from the leaf springs and so that they will check periodic and cumulative oscillations of the vehicle body and absorb shocks. This auxiliary spring device can readily be attached to almost all motor cars which are provided with leaf springs, and it can be made of different sizes and strengths to co-act with different leaf springs. The piston-rod can be uncoupled from the plate 24 by slacking or unscrewing the nuts, when the auxiliary spring device is not required in action, and the nuts can be arranged to act as tappets if desired when partially unscrewed.

What I claim is:

1. The combination, with a car body, a car axle, and a leaf spring which supports the body from the axle; of a cylinder provided with a laterally projecting lug at its middle part which bears on one surface of the spring, a plate which bears on the other surface of the spring and having an eye which is slidable on the cylinder, a clamping bolt engaging with the said plate and lug, a piston slidable in the cylinder and provided with a piston-rod which is operatively connected with the car body, and springs arranged between the piston and the ends of the cylinder.

2. The combination, with a car body, a car axle, and a pair of leaf springs which support the body from the axle; of a cylinder provided with a laterally projecting lug at its middle part which rests on the middle part of the lower leaf spring to one side of the axle, a plate arranged under the lower leaf spring and provided with an eye which is slidable on the cylinder, a clamping bolt engaging with the said plate and lug, a piston slidable in the cylinder and provided with a piston-rod having a screwthreaded portion at its upper end, springs arranged between the piston and the ends of the cylinder, a plate secured to the upper leaf spring and having a hole which is slidable over the secrewthreaded end portion of the piston-rod, and fastening nuts screwed on the said screwthreaded portion on each side of the last said plate.

In testimony whereof I have affixed my signature in the presence of two witnesses.

HENRY J. MITCHELL.

Witnesses:
  E. D. WATERS,
  HARRY A. ZOOK.